United States Patent [19]

Thiede

[11] Patent Number: 4,660,788

[45] Date of Patent: Apr. 28, 1987

[54] SUPERCRITICAL WING

[75] Inventor: Peter Thiede, Ganderkesee, Fed. Rep. of Germany

[73] Assignee: Vereinigte Flugtechnische Werke GmbH, Bremen, Fed. Rep. of Germany

[21] Appl. No.: 213,864

[22] Filed: Dec. 8, 1980

[30] Foreign Application Priority Data

Dec. 6, 1979 [DE] Fed. Rep. of Germany ....... 2949133

[51] Int. Cl.$^4$ .............................................. B64C 21/06
[52] U.S. Cl. .................................................... 244/209
[58] Field of Search ..................... 244/35 R, 204, 207, 244/208, 209

[56] References Cited

U.S. PATENT DOCUMENTS 3,275,266  9/1966  Cockerell ............................ 244/207
3,951,360  4/1976  Anxionnaz .......................... 244/209

FOREIGN PATENT DOCUMENTS 2712717  9/1978  Fed. Rep. of Germany .... 244/35 R

OTHER PUBLICATIONS

"Laminar Flow Control Technology", NASA Facts, (NF86/8-79), Aug. 1979, pp. 1-8.

Primary Examiner—Sherman D. Basinger
Assistant Examiner—Rodney Corl
Attorney, Agent, or Firm—Ralf H. Siegemund

[57] ABSTRACT

A supercritical wing of the variety in which the compression shock is stabilized is being improved by providing a suction device, substantially along the entire wing span, right at the chord station of the upper-wing surface where intercepting the sonic line. Specific rules concerning the suction and suction slit are given. A small chord station range may be covered by a movable slot or several parallel-running slots. The surface contour may be modified right at a slot to, thereby stabilize the compression shock further. The invention shifts buffet onset to larger off-design Mach numbers and angles of attack.

8 Claims, 10 Drawing Figures

SUPERCRITICAL WING

BACKGROUND OF THE INVENTION

The present invention relates to a supercritical wing for aircraft.

A supercritical wing is defined or commonly understood to be an airfoil designed for subsonic flights, but having a flow field along its upper surface which flow field includes an extended portion that is supersonic. Wings and airfoils of this type are usually designed for a Mach number not exceeding 0.85. A wing of this type is, for example, disclosed in German printed patent application 27 12 717 (see also U.S. patent application, Ser. No. 888,319, filed Mar. 20, 1978 now U.S. Pat. No. 4,455,003) The upper surface of this particular wing develops a significant transsonic suction region which drops continuously toward the rear end, substantially without development of compression shocks. The same is not true with regard to earlier wing designs such as shown in U.S. Pat. Nos. 3,952,971 and 4,072,282.

Shock-free behavior of the wing as per U.S. Pat. No. 4,455,003 (Ser. No. 888,319) is true only for a particular angle of attack and a particular Mach number. Upon increasing either, a compression shock will develop, increasing in intensity with increasing angle of attack and/or Mach number. However, that particular wing is designed to stabilize the location of that shock on the wing's upper surface. This way, one avoids changes of the longitudinal moment in the off-design range.

It was observed, however, that this known wing is limited in its range of use by the so-called buffet onset, i.e., by the development of in-stationary, shock-induced separations and the effect such separations have upon the flow pattern around the wing.

DESCRIPTION OF THE INVENTION

It is an object of the present invention to provide a supercritical wing in which a shock-induced boundary layer separation occurs for stronger shocks only, and only for larger angles of attack and larger Mach numbers than in the case of the known wing profiles.

It is, therefore, another, but related, object of the present invention to improve the useful, operational range for supercritical wings and to improve flight performance accordingly. The preferred wing profile to be improved as per the present invention is one which exhibits no shock for the design Mach number and angle of attack; but the invention is also applicable in cases in which a relatively weak compression shock occurs even for the design-operating case.

It is thus a specific object of the present invention to improve airfoils and wings of the type in which the location of shock formation has been stabilized in such a way as shown in U.S. patent application, Ser. No. 888,319 now U.S. Pat. No. 4,455,003.

In accordance with the preferred embodiment of the invention, it is suggested to improve a supercritical airfoil as per the objects, particularly as per the specific object, by providing suction along the upper surface of the wing at the location of formation and development of a shock in order to suck up a portion of the boundary layer. This partial sucking-up of the turbulent boundary layer shifts the shockinduced boundary layer separation toward a larger shock. Shock point migrations, resulting otherwise from the separation, and in-stationary shock oscillations (buffeting) are thus suppressed in an extended off-design range, as compared to situations which would exist if the suction were not provided for at the specified location. Thus, the invention stabilizes the transsonic flow pattern across the wing beyond the range attained by mere profiling. One may also say that the invention shifts the (ultimately inevitable) buffet onset to larger off-design Mach numbers and larger angles of attack, resulting in correspondingly larger lift coefficients and lower drag coefficients in Mach number and angle of attack ranges in which, otherwise, the performance would drop drastically. The design number for the lift/drag ratio is improved accordingly.

The suction as per the invention reduces also the boundary layer in the below-buffet onset range which enhances lift. Of course, the suction requires a certain amount of additional equipment; but it is believed that, at least as far as cost is concerned, this expenditure is partially offset by the overall reduction in drag and increase in lift.

The advantage of the invention is not limited to commercial aircraft and the commonly used Mach numbers. Military aircraft are also improved, even at their transsonic speed range, as far as their maneuverability is concerned because buffeting is also here a limiting factor.

It should be noted that suction or blowing of the boundary layer is known per se for the subsonic range. See, e.g., German printed patent application 20 35 445 and U.S. Pat. No. 3,801,048. The purpose of the known suction or blowing is to prevent a change from laminar to turbulent boundary layer flow at critical points of the wing's profile and surface in order to prevent the separation of the laminar flow boundary layer by operation of such change-over to turbulence. The suction as per the present invention does not involve laminar flow, but is concentrated in a particular area of a particular type of wing, namely a wing which is contoured to stabilize the root of the sonic line which, of course, presupposes that a sonic line appears at the wing in the first place.

Generally speaking, a single suction slot suffices, having a width between one-quarter and one-half of the thickness of the boundary layer being sucked up. The suction pressure should be selected so that the suction speed is about equal to the mean speed in the boundary layer portion being sucked up. Contour modification of the wing right at the slot further stabilizes the sonic line and shock-producing zone right at the slot. Alternatively, one may provide a limited number of parallel slots, or a movable slot to cover the range of migration of the shock-producing zone and sonic line. In the preferred form of practicing the invention, using a wing whose profile follows the rules set out in U.S. Pat. No. 4,455,003 (Ser. No. 888,319), the slot or slots (or movable slot range) should be within 55% to 70% of chord depth, measured from the leading edge or nose of the wing.

The preferred embodiment of the invention, the objects and features of the invention, and further objects, features and advantages thereof, will be better understood from the following description taken in connection with the accompanying drawings.

Figure 1:
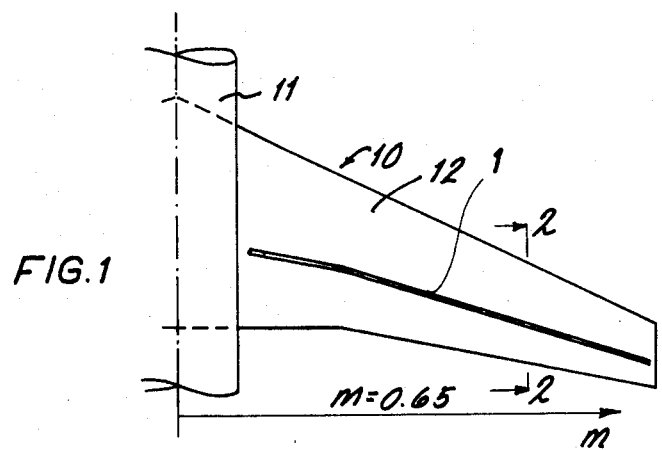
FIG. 1 is a top elevation of a wing improved in accordance with the preferred embodiment of the invention.
Figure 2:
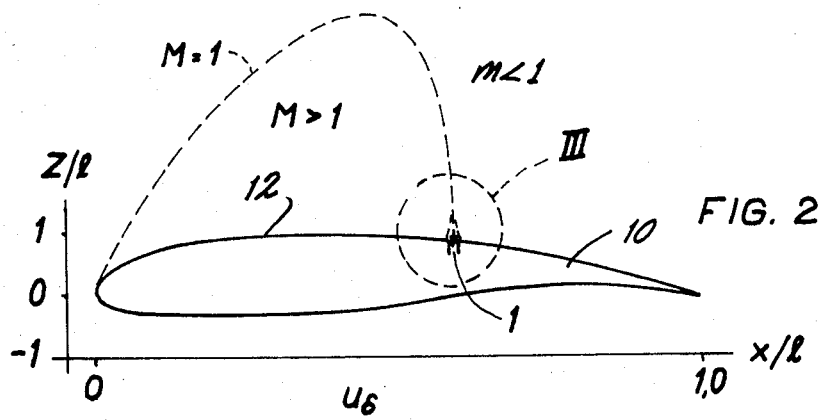
FIG. 2 is a section view at a particular location through the wing shown in FIG. 1.
Figure 3:
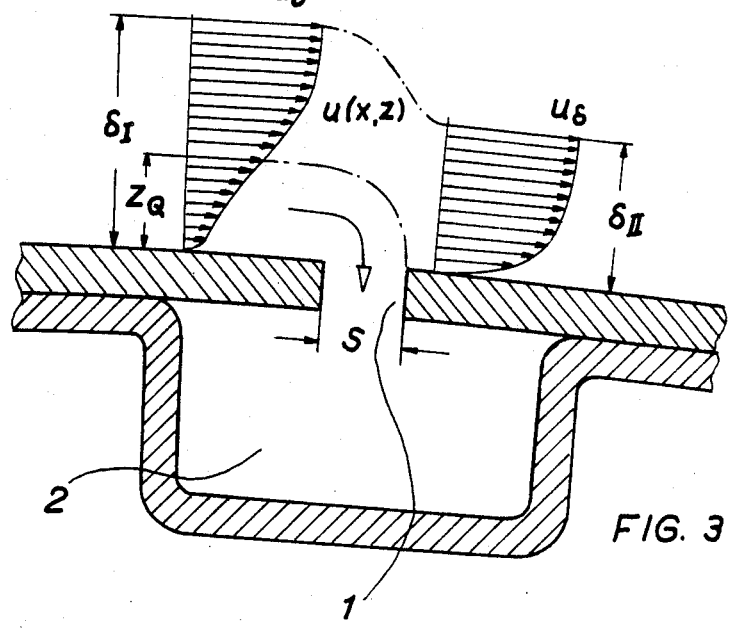
FIG. 3 is an enlarged view of detail III as so identified in FIG. 2.

The wing 10 depicted in FIG. 1 and extending from the fuselage 11 of an aircraft is constructed to have an aspect ratio $\theta=9$; a sweep-back angle $\zeta_{25}=28°$; a tapering $\tau=0.216$; and a kink at $\eta=0.4$ ($\eta$ being the relative distance from the longitudinal axis of the aircraft in the direction of wing span extention. As far as the wing's profile is concerned, FIGS. 2 and 3 depict sections at point $\eta=0.65$ as a representation. The profile is characterized by a rather large radius of the nose, a rather flat upper surface, but a rather strong curvature near the trailing edge. The wing's contour and its curvature distribution may follow the rules set forth in U.S. Pat. No. 4,455,003 (Ser. No. 888,319), even the specific example disclosed therein; but in the following, a rated Mach number of $M=0.75$ for a rated angle of attack of $\alpha=+2.5°$ is presumed as design parameters.

The upper surface 12 of the wing 1 is now provided with a suction slot 1, being particularly located in the upper wing surface, almost along the entire wing span. FIG. 2 shows also the sonic line ($M=1$) for this particular wing. That sonic line should end right at that slot 1. In other words, the location (chord station) of slot 1 is selected to be right at the root of the sonic line. This point on the wing which meets the sonic line is stabilized for the particular wing profile, it migrates little with an increase in the angle of attack or with increasing speed. One can also say that slot 1 is located at a station about $x/1-0.6$ which is in between the first curvature minimum and the curvature maximum of the upper surface. The sonic line moves over a range from about $x/1=0.55$ to 0.7, and the location of the slot is limited to that range.

The opening or slot 1 leads to a suction channel or suction plenum chamber 2 attached to the upper surface skin inside the wing. This channel 2 leads to a suction unit being disposed either in the fuselage 11 or in the wing itself. If the suction pump is disposed in the fuselage, a common unit can be used for both wings. Less powerful pumps are needed if a separate one is provided for each wing. The choice here is dictated primarily by other design considerations and availability of space.

The width S of the slot 1 is dimensioned to be less than the height of the boundary layer to be sucked up. FIG. 3 shows also the velocity profile ($u(x, z)$) fore and aft of the slot; the profiles are particularly drawn for the boundary region. The figure is a section through the wing for $\eta=0.65$. The boundary layer has a thickness $\delta$. This thickness has a value $\delta_I$ upstream from the slot 1 and a reduced value $\delta_{II}$ downstream therefrom. The slot width S should be about $\frac{1}{4}$th to $\frac{1}{2}$ of $\delta_I$, which is about $Z_Q$, as shown. The pressure in chamber 2 is selected so that the suction speed equals approximately the mean velocity of the portion of the boundary layer ($Z_Q$) to be sucked up. Such a value for the suction speed avoids any significant accelerations or decelerations in the boundary layer as it is being sucked up. The suction reduces the boundary layer thickness and provides a "rounder" profile contour. This is particularly instrumental in the prevention of separation, when the actual angle of attack and/or the actual Mach number increases during the flight.

Figure 4A:
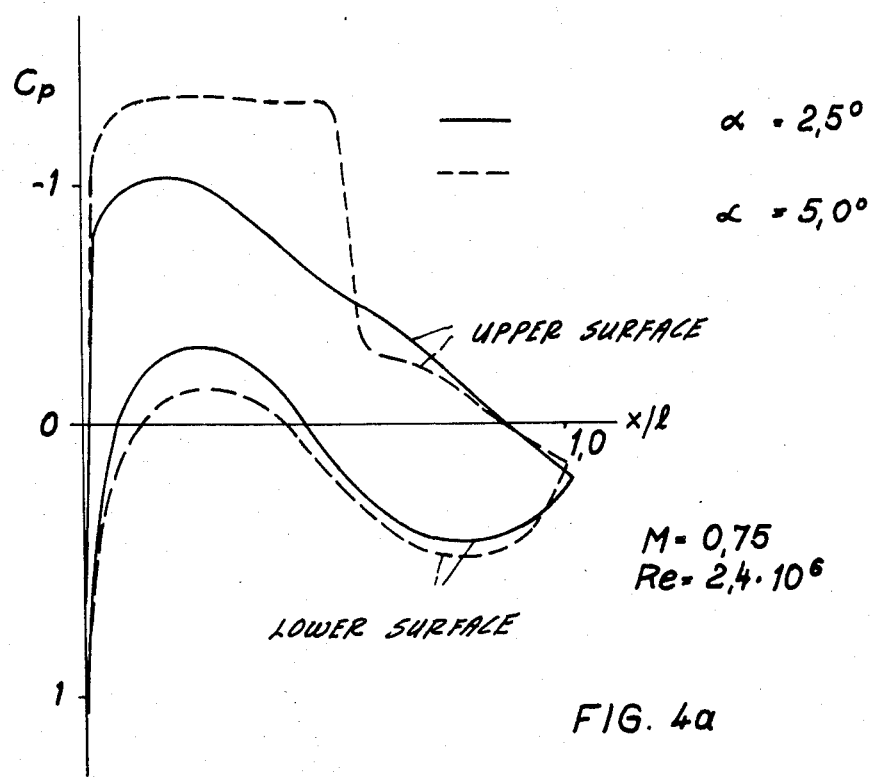
FIG. 4a is a graph showing the pressure distribution of the wing and in the section plane as per FIG. 2, but without the inventive suction feature.
Figure 4B:
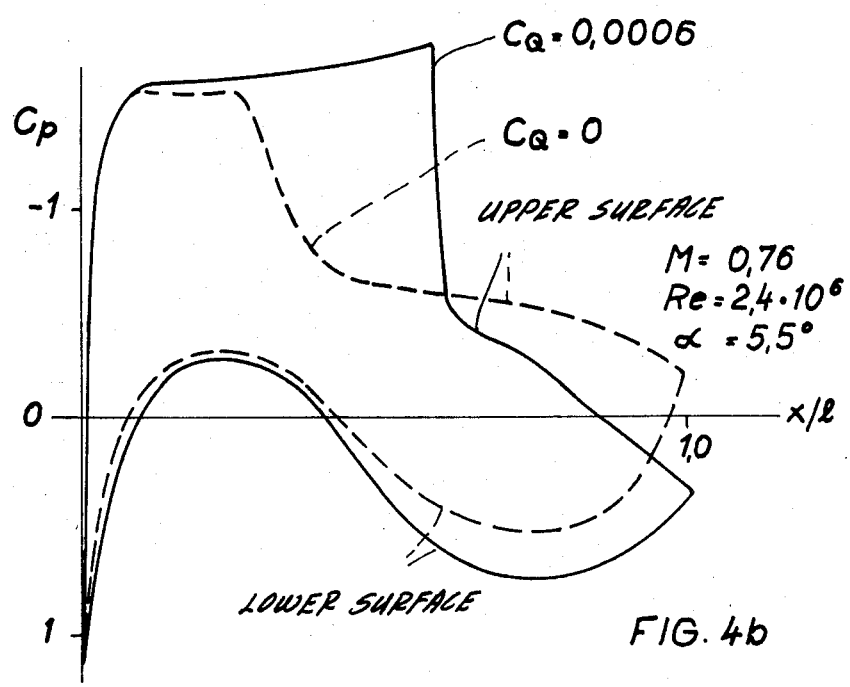
FIG. 4b is a graph similar to FIG. 4a, but with and without the suction feature as per the best mode of practicing the invention.

The advantage of the invention is further demonstrated by FIGS. 4a and 4b. The solidly drawn curves in FIG. 4a depict the pressure distribution on upper and lower surfaces plotted from the nose ($x/1=0$) to the trailing edge ($x/1=1$) and for the stated parameters, Mach number M and Reynold's number Re; as stated, the rated (design) angle of attack $\alpha=2.5°$. The curves are all taken for profiles as per FIG. 2, at the wing location given by $\eta=0.65$.

The pressure distribution drops gradually from a peak value and is practically shockless. The dotted lines represent an off-design condition, in which the angle of attack $\alpha=5.0°$. A strong shock appears at the end of the sonic line. This shock increases in severity with further increase of the angle of attack and/or with an increase in the Mach number beyond the rated number of $M=0.75$. It is presumed that suction is not provided for. Generally speaking, the shock severity increases when the angle of attack and/or the Mach number increases above their rated values. As the shock reaches a particular strength, one obtains at first a so-called separation bubble which "pops" for still higher shocks. The bursting of the bubble occurs actually ahead of boundary layer separation and is the equivalent of buffet onset. The FIG. 4a actually depicts a pressure distribution which just about concurs with buffet onset. In other words, the 5° angle is about the limit before buffet onset. The shock point moves very little across the wing (in the direction of flight) until buffet onset has actually been reached, for a profile as per FIG. 2 and a design pressure distribution as per the solid curve in FIG. 4a.

FIG. 4b illustrates in a dashed curve the situation when buffet onset has been exceeded and suction is still not provided for. The angle of attack has been increased to 5.5° and the Mach number has also increased to 0.76. The shock point has moved forward. All of the curves, as considered thus far, are applicable to a wing without suction as per the invention. This is particularly represented in FIG. 4b by a suction coefficient of $C_Q=0$. The flow has separated from the wing.

The situation is quite different when suction is provided for at a suction coefficient of $C_Q=0.0006$; this being a suction in accordance with the rule given above. The solid curve in FIG. 4b shows that, even for the off-design parameters $\alpha=5.5°$, $M=0.76$, the location of the shock point remains stabilized. The compression shock is relatively severe, but does not produce buffet onset.

Figure 5:
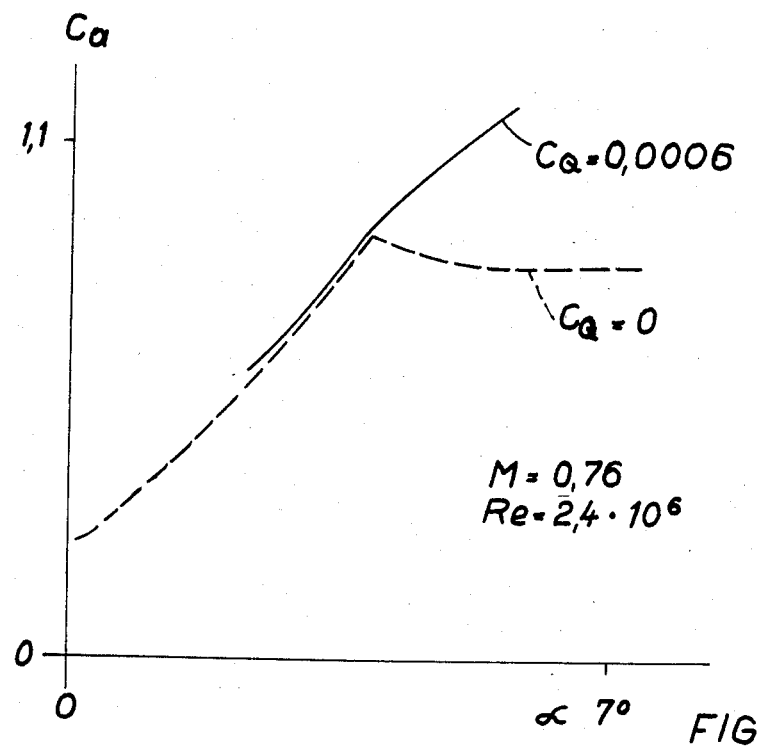
FIG. 5 is a graph showing the lift coefficient of the wing, in the section plane of FIG. 2, and plotted against the angle of attack.
Figure 6:
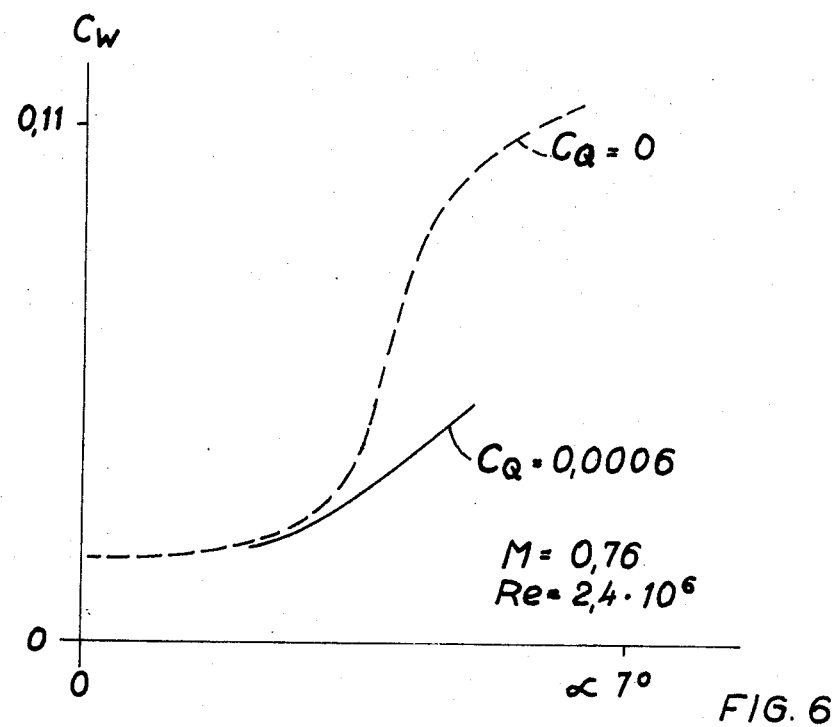
FIG. 6 is a graph of the drag coefficient analogous to FIG. 5.

FIGS. 5 and 6 compare supercritical wings with and without suction on a different basis. FIG. 5 shows the lift coefficient in dependence upon the angle of attack. The comparison is again made in a section plane, as per FIG. 2 ($\eta=0.65$). With no suction (dashed line, $C_Q=0$), the lift coefficient drops slightly at the particular angle of attack for which buffet onset occurs. With suction ($C_Q=0,0006$, solid line), overall lift is already slightly higher, but increases further to, thereby, avoid buffet onset. At much higher angles of attack, buffet onset will also occur here, but the critical angle has been shifted definitely to, thereby, enhance maneuverability of the aircraft.

FIG. 6 illustrates analogously the resistance or drag coefficient. Without suction (dashed line), the drag increases drastically on buffet onset; the increase is much smaller and a more gradual one while suction is provided for (solid line). FIGS. 5 and 6, thus, demonstrate that the performance of the wing and, therefore, of the aircraft as a whole is considerably improved by suction along the root of the sonic line in the wing's surface.

Figure 7:
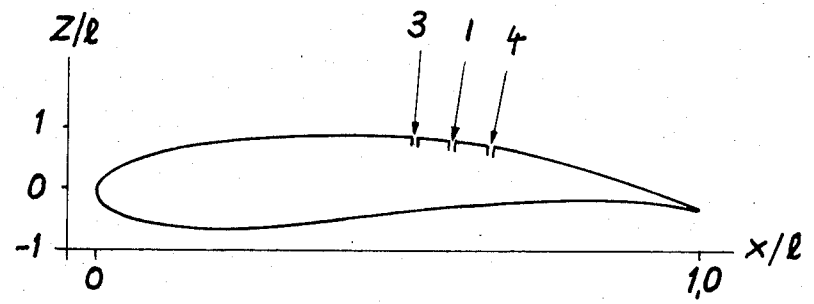
FIGS. 7, 8, and 9 are schematic views of supercritical airfoil profiles improved in accordance with further examples of the preferred embodiment.

FIG. 7 illustrates a wing which is further supplemented by two additional slots, 3 and 4. These run parallel to suction slot 1, and each may have its own suction plenum. By means of manifolding, suction pressure may be switched from one slot to the next, depending upon the expected migration of the root of the sonic line and of the compression shock-producing zone. However, it is required that the sonic line moves only very little in the off-design-operating range, in the order of about 10% of chord depth or less, and the slots 1, 3, and 4 are spaced accordingly. In particular, they should all be located in chord stations within the range of $x/l=0.55$ to 0.7. Multiple slots offer the advantage that one can suck basically always right at the root of the sonic line, i.e., right at the area in which the compression shock is produced, even if that zone moves a little.

Figure 8:
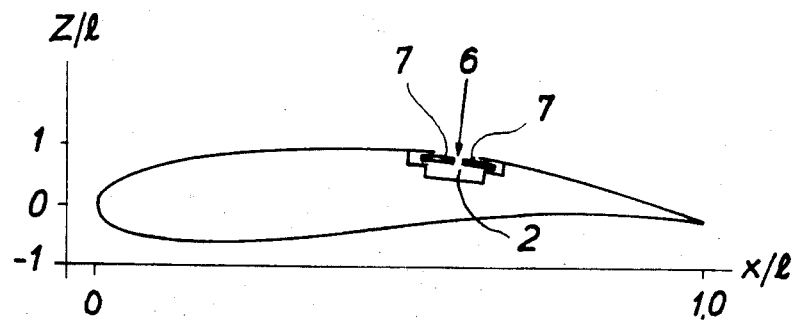

FIG. 8 illustrates another modification. The slot 5 in this case is quite wide, but is partially covered by a diaphragm-like element 7 having a narrow slot 6 commensurate with the design rules given above. The diaphragm 7 can be moved over a limited range, above the larger suction plenum 2' so that the slot 6 may follow a limited displacement of the sonic line and compression shock-producing zone. Thus, the diaphragm 7 will be controlled in accordance with the extent of current off-design, operational conditions to track the shock-producing zone. The range covered here will also be within the $x/l=0.55$ to 0.7 chord station range.

Figure 9:
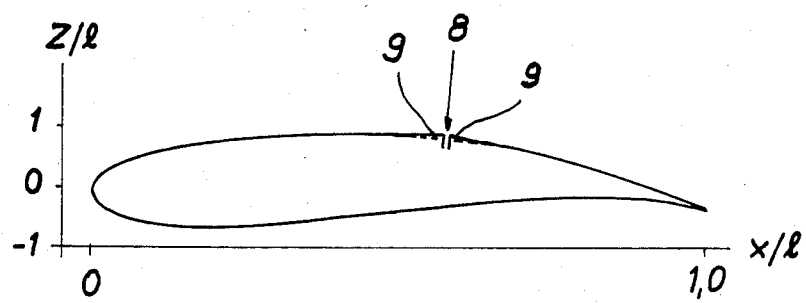

The airfoil design shown in FIG. 9 is an improvement over the single-slot design. The dotted line depicts the regular contour of the wing's upper surface, such as per U.S. patent application, Ser. No. 888,319, above. This contour is locally modified in the slot area (slot 8) in order to obtain a weak, outwardly extending contour kink. The profile is almost completely flat at the aft and fore of the slot, smoothly continuing the contour from a little beyond in either direction toward the slot so that the effective curvature is almost zero immediately at the fore and aft of the slot. The contour's discontinuity (kink) is "covered" by the suction slot. This was found to stabilize the sonic line and shock-producing zone in the suction zone.

It can, thus, be seen that the inventive design improves a supercritical wing and airfoil profile, provided the profile exhibits a stabilized location for compression shock; the suction as provided defers buffet onset to larger off-design-operating parameters and, thus, improves in such cases the lift-to-drag ratio.

The invention is not limited to the embodiments described above; but all changes and modifications thereof, not constituting departures from the spirit and scope of the invention, are intended to be included.

I claim:

1. Supercritical airfoil having a contour which stabilizes the zone of compression shock production to a limited chord range on the upper surface, the improvement comprising:
   means disposed exclusively in the limited chord range for sucking up a portion of the turbulent boundary layer.

2. An airfoil as in claim 1, the range being between chord 55% to 70% of relative chord depths, there being at least one slot in that range, the slot extending substantially along the entire wing span.

3. An airfoil as in claim 1, the means including at least one slot in said range, there being a suction channel underneath the slot, inside said airfoil.

4. An airfoil as in claim 1, 2, or 3, there being plural, parallel-running slots in said range.

5. An airfoil as in claim 2 or 3, the slot being established by a diaphragm, there being means for movably mounting the slot to the airfoil.

6. An airfoil as in claim 3, the suction pressure being selected so that the suction speed is approximately equal to the means' velocity of the boundary layer portion being sucked up.

7. An airfoil as in claim 2, 3, or 6, the slot having a width of about one-half to one-quarter of the the boundary layer in the wing's upper surface, in front of the slot.

8. An airfoil as in claim 1, the means including one slot extending for approximately the entire wing span, the contour of the airfoil being modified toward a slight outward extension, resulting in a hypothetical kink in the slot area, to further stabilize the shock-producing area right at the slot.

* * * * *